United States Patent Office 2,784,731
Patented Mar. 12, 1957

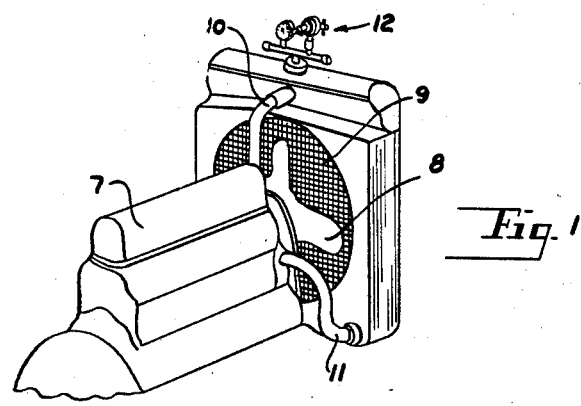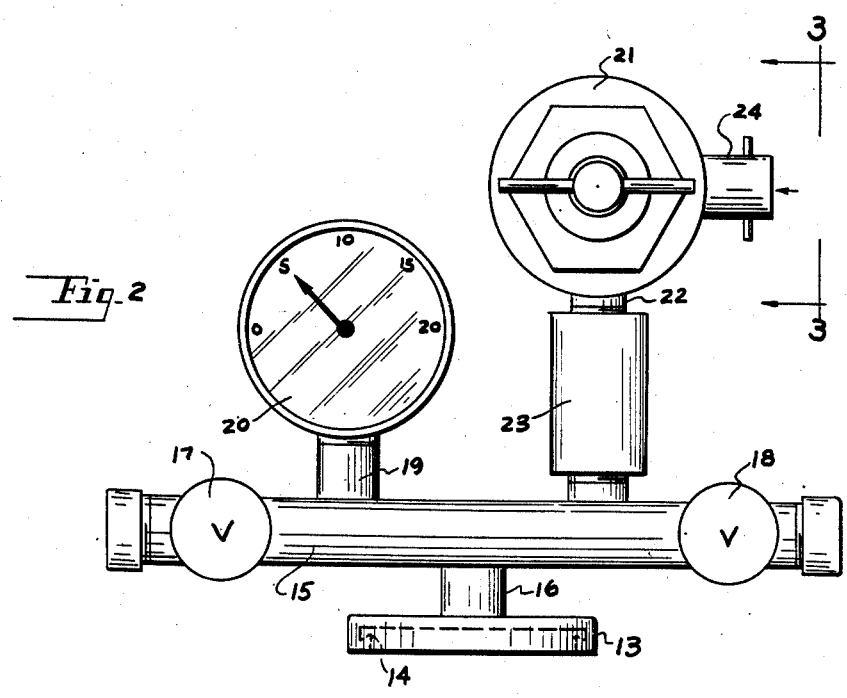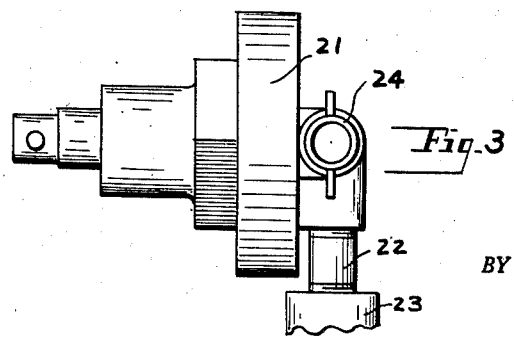

2,784,731

PRESSURE DEVICE FOR USE IN IMPREGNATING RADIATORS

Irving W. Bealer, Detroit, Mich.

Application December 7, 1953, Serial No. 397,840

1 Claim. (Cl. 137—505.11)

This invention relates to automotive vehicle radiators, and has particular reference to a device for use in sealing, by impregnation, the leaks in a vehicle radiator without the necessity of removing the radiator from the vehicle.

An object of the invention is to provide a device which may be utilized in sealing radiator leaks, by a method similar to that disclosed in my co-pending application, Serial No. 396,625, filed December 7, 1953.

Another object of the invention is to provide a means, whereby a sealing material may be applied to the vehicle radiator in such manner that flexible internal plugs are formed in the leaks and openings in the radiator.

Another object of the invention is to provide a device of the character indicated, which may be employed with a conventional vehicle radiator, while the radiator remains hooked up to the cooling system of the vehicle, whereby the operator is enabled to impregnate and seal even the most minute leaks and openings in the radiator.

Another object of the invention is to provide a device which may be attached directly to the vehicle radiator, in place of the conventional radiator cap, whereby a novel process of impregnating and sealing the radiator against leaks may be practiced with a minimum of special equipment.

Another object of the invention is to provide a device of the character indicated, which is simple in construction, economical to manufacture, and efficient in operation.

The foregoing and other objects and advantages of the invention will become more apparent as the description proceeds, reference being made from time to time to the accompanying drawing forming part of the within disclosure, in which drawing:

Fig. 1 is a perspective view of a conventional radiator, which is hooked up to the cooling system of an internal combustion engine and to which is attached a device embodying the invention.

Fig. 2 is an enlarged front elevational view of the device embodying the invention.

Fig. 3 is an enlarged fragmentary detail taken on the line 3—3 of Fig. 2.

Referring now more particularly to the drawing, it will be understood that in the embodiment herein disclosed, the reference character 7 indicates an internal combustion engine having a fan 8 and a radiator 9, which is connected, as at 10 and 11, to the cooling system of the internal combustion engine 7. Mounted on top of the radiator 9 is the device which is generally indicated by the reference character 12, and which embodies the invention. The device 12 (Fig. 2) consists of a cap or closure member 13, which takes the place of the conventional radiator cap during the impregnating and sealing operation hereafter described. The closure member or cap 13 is provided with conventional locking elements 14, so that the cap may be tightly secured to the radiator whereby to close the radiator filler opening. Mounted on the cap 13 is a tubular member 15, which communicates through the tubular member 16, with the interior of the radiator. At one end of the tube 15 is mounted an automatic pressure release, or safety "pop-off" valve 17. At the other end of the tube 15 is mounted a manually operable pressure release valve 18. These valves may be combined if desired. Secured intermediate the ends of the tubular member 15, and in communication with the interior thereof through the member 19, is a pressure gage 20, which is preferably calibrated from 0 lbs. to 20 lbs. per square inch of pressure. Also mounted intermediate the ends of the tubular member 15, is an air pressure regulator 21, which communicates through the tubular member 22 and the check valve 23, with the interior of the tubular member 15. A quick coupling air inlet member 24 communicates with the air pressure regulator 21 and is arranged so that a conventional air hose may be attached thereto.

It is within the contemplation of the invention to combine the release valves 17 and 18, and to direct their outlets downwardly, so that any fluids or vapors released from the system may be directed downwardly and away from the operator. It will also be understood, and it is within the contemplation of the invention, that other modifications in the positioning and arrangement of the elements may be made so long as they operate and function in the manner hereinafter described.

The device functions as follows:

In practicing my invention, it is preferable to first remove the thermostat from the cooling system of the vehicle, if the vehicle is provided with such a thermostat, and then to plug the over-flow vent of the radiator. The cooling system is then filled with clean water to which is added a suitable sealer. I prefer to use an asbestos base sealer, which is replete with multitudinous fibers, which will function under a wide range of temperatures and which will withstand the various mechanical stresses developed during the moving and twisting of the radiator when the said radiator is in use in the vehicle, and which will withstand the other fatigues which develop during normal operations. Such a sealer in the presence of water or other suitable solvent, and under the proper temperatures and pressure factors, as herein described, will form virtual flexible plugs in the leaks and radiator openings which will withstand all of the vicissitudes encountered. The device embodying the invention is then installed on the radiator so that the cap 13 seals the radiator filler opening.

The vehicle engine is then started and is operated at advanced idle for a suitable length of time to insure a thorough mixing and circulation of the sealer and the coolant at a comparatively high temperature. The pressure in the system may be increased during this initial operation due to liquid expansion. The developed pressure, however, is not sufficient to force the sealing mixture properly through any opening that might exist in the radiator. I, therefore, now increase the pressure in the cooling system by attaching to the air inlet 24 a compressed air hose. The pressure is increased in the system until the internal pressure in the system has reached a pressure not to exceed 15 lbs. per square inch. I continue to operate the engine at advanced idle from 1½ to 2 minutes while maintaining the internal pressure as indicated. The engine is now stopped, but the air pressure is maintained in the system at from 5 to 15 lbs. per square inch, until the mixture in the cooling system is cooled to room temperature. The internal pressure is then released through the manual release valve 18 after which the radiator cap and assembly is removed.

After this operation, it will be found that all of the openings, breaks, and voids in the radiator have been impregnated with flexible plugs which will withstand fatigues encountered in normal operating conditions.

I provide an automatic pressure release for "pop-off" valve 17 to relieve the internal pressures in the system during the use of the device embodying the invention should such pressures rise above the maximum desirable operating pressure. I also provide a check valve 23 in the air inlet line so that the liquid coolant and sealing compound may not flow into the air line during the introduction of air into the system.

Having described my invention, what I claim and desire to secure by Letters Patent is:

A radiator attachment for use in impregnating a radiator against leaks comprising a cap adapted for closing the filler opening of a radiator, a tubular member affixed transverse to and in communication with the cap, said tubular member being closed at each end and having a pressure relief valve adjacent each of said ends, a pressure gauge intermediate the said relief valves and attached to and in communication with the tubular member, an air inlet passage intermediate one of said relief valves and said pressure gauge attached to and in communication with the said tubular member, said air inlet passage having means to regulate flow therethrough and a check valve interposed between said regulating means and said tubular member.

References Cited in the file of this patent

UNITED STATES PATENTS

| | | |
|---|---|---|
| 1,782,496 | Anchelevich | Nov. 25, 1930 |
| 2,003,949 | Morgan | June 4, 1935 |
| 2,171,113 | Hopkins | Aug. 29, 1939 |
| 2,178,901 | Webster | Nov. 7, 1939 |
| 2,446,219 | Eaton | Aug. 3, 1948 |